US009574127B2

(12) United States Patent
Chapman

(10) Patent No.: US 9,574,127 B2
(45) Date of Patent: Feb. 21, 2017

(54) WELLBORE FLUID

(75) Inventor: John W. Chapman, Stonehaven (GB)

(73) Assignee: M-I Drilling Fluids UK Ltd., Aberdeen, Aberdeenshire (GB)

( * ) Notice: Subject to any disclaimer, the term of this patent is extended or adjusted under 35 U.S.C. 154(b) by 59 days.

(21) Appl. No.: 14/127,153

(22) PCT Filed: Jun. 22, 2012

(86) PCT No.: PCT/GB2012/051477
§ 371 (c)(1),
(2), (4) Date: Aug. 12, 2014

(87) PCT Pub. No.: WO2012/176000
PCT Pub. Date: Dec. 27, 2012

(65) Prior Publication Data
US 2015/0021027 A1 Jan. 22, 2015

(30) Foreign Application Priority Data

Jun. 23, 2011 (GB) .................................. 1110672.1

(51) Int. Cl.
*C09K 8/42* (2006.01)
*E21B 33/13* (2006.01)
*C09K 8/035* (2006.01)

(52) U.S. Cl.
CPC ............... *C09K 8/426* (2013.01); *C09K 8/035* (2013.01); *E21B 33/13* (2013.01)

(58) Field of Classification Search
None
See application file for complete search history.

(56) References Cited

U.S. PATENT DOCUMENTS

| 3,928,322 A | 12/1975 | Sugiyama |
| 4,671,691 A * | 6/1987 | Case ................. B43K 7/01 106/31.38 |
| 4,758,356 A | 7/1988 | Downs |
| 5,049,401 A * | 9/1991 | Harada ................. A23L 1/2147 426/573 |
| 5,152,906 A | 10/1992 | Aften et al. |
| 5,314,031 A * | 5/1994 | Hale ................. C04B 28/08 166/292 |

(Continued)

FOREIGN PATENT DOCUMENTS

| CN | 101735791 A | 6/2010 |
| EP | 2264119 A1 | 12/2010 |

(Continued)

OTHER PUBLICATIONS

International Search Report of PCT/GB2012/051477 dated Dec. 19, 2012.

(Continued)

*Primary Examiner* — Angela M DiTrani
*Assistant Examiner* — Anuradha Ahuja
(74) *Attorney, Agent, or Firm* — Sara K.M. Hinkley

(57) ABSTRACT

The present invention provides a wellbore fluid, such as a drilling, completion or workover fluid, said wellbore fluid comprising a glucomannan additive. Further provided is a method of forming a gel plug from the wellbore fluid, a method of modifying the properties of a wellbore fluid, a method of drilling a subterranean hole with such a fluid and the use of glucomannan in wellbore fluids.

17 Claims, 5 Drawing Sheets

(56) References Cited

U.S. PATENT DOCUMENTS

| | | | |
|---|---|---|---|
| 5,795,764 A | 8/1998 | Christgau et al. | |
| 7,842,741 B2 * | 11/2010 | Engelhardt | C08K 5/0091 524/801 |
| 2002/0019447 A1 * | 2/2002 | Renn | A23L 1/0526 516/77 |
| 2005/0000734 A1 | 1/2005 | Getzlaf et al. | |
| 2006/0116296 A1 * | 6/2006 | Kippie | C09K 8/12 507/244 |
| 2008/0318812 A1 * | 12/2008 | Kakadjian, Sr. | C09K 8/035 507/221 |
| 2009/0203555 A1 * | 8/2009 | Milne | C09K 8/508 507/222 |
| 2010/0048429 A1 * | 2/2010 | Dobson, Jr. | E21B 43/25 507/212 |
| 2011/0223192 A1 * | 9/2011 | Gahler | A61K 31/736 424/195.18 |

FOREIGN PATENT DOCUMENTS

| | | |
|---|---|---|
| WO | 93/03047 A1 | 2/1993 |
| WO | 2009/097286 A1 | 8/2009 |

OTHER PUBLICATIONS

Paradossi et al, "Xanthan and Glucomannan Mixtures: Synergistic Interactions and Gelation", Biomacromolecules, American Chemical Society; US, vol. 3, No. 3. Jan. 1, 2002, pp. 498-504.

* cited by examiner

WELLBORE FLUID

BACKGROUND OF THE INVENTION

Field of the Invention

The present invention relates to a wellbore fluid, particularly a water-based wellbore fluid, comprising a glucomannan additive, a method of forming a gel from the wellbore fluid, a method of modifying the properties of a wellbore fluid, a method of drilling a subterranean hole with such a fluid and the use of glucomannan in wellbore fluids.

Background Art

Various wellbore fluids can be used for a variety of functions in the drilling, completion and working of a wellbore. For instance, during drilling, the wellbore fluid may be a drilling fluid which is circulated through a drill string and drill bit into the wellbore, and then may subsequently flow upward through the wellbore to the surface. A drilling fluid can act to remove drill cuttings from the bottom of the wellbore, conveying them to the surface, can hold cuttings and weighting material in suspension when circulation is interrupted, can control subsurface pressure, can maintain the integrity of the wellbore until the well section is cased and cemented, can provide sufficient hydrostatic pressure to prevent the ingress of formation fluids into the wellbore, thereby isolating the drilling fluid from the formation, can cool and lubricate the drill string and drill bit, and/or can maximize penetration rate.

Wellbore fluids are typically formulated to exhibit properties desired for a particular function. For instance, a drilling fluid is preferably formulated to exhibit a rheology that both enhances the suspension characteristics of the fluid for the removal of drill cuttings and also minimizes the pressure drop in the drill string.

While the viscosity of the drilling fluid at high shear rates affects the pressure drop in the drill string and annulus, the viscosity of the drilling fluid at low shear rates influences the suspending and solids (i.e. weighting agents, drill cuttings) carrying capacity of the drilling fluid. Drilling fluid rheology at high shear rates is commonly referred to as the plastic viscosity (PV), or high shear rate viscosity, as defined by the Bingham plastic model:

$$\tau = PV(\gamma) + YP$$

wherein $\tau$ is the shear stress [force/area; lb/100 ft$^2$] applied to the drilling fluid, and $\gamma$ is the shear rate [time$^{-1}$]). Rheology at low shear rates is often characterized by the yield point (YP), also referred to as the low shear rate viscosity, as defined by the Bingham model. The Bingham model is widely employed to describe fluid flow in the drilling fluids industry.

Wellbore fluids may be water-based, non water-based or gaseous (pneumatic). Water-based wellbore fluids are principally composed of an aqueous solution as the continuous phase. A variety of components or additives may be added to the water-based wellbore fluid in order to achieve different desired fluid properties. Water-based wellbore fluids are normally formulated to include one or more rheology modifiers, particularly for many rotary drilling operations. A rheology modifier imparts desired rheological properties to the fluid by influencing its flow and deformation. Such a rheology modifier may be a viscosifying agent. In general, viscosifying agents are typically natural and synthetic polymers such as polysaccharides and polysaccharide derivatives. Examples of suitable viscosifying agents include starches, scleroglucans, guar gums, polyacrylates, xanthan gum, as well as combinations of these compounds.

Xanthan gum is a natural polysaccharide which is often used as an additive for water-based wellbore fluids, especially drilling fluids, particularly for rheological control, such as taught in U.S. Pat. No. 4,758,356. Xanthan gum provides a high activity in combination with a good low shear rheology profile and robustness to contamination. However, it is costly and at elevated temperature exhibits a loss of low shear rate viscosity (LSRV). A need therefore exists to provide an alternative additive which addresses these problems which can be incorporated into wellbore fluids to impart improved properties, particularly rheological control, temperature stability in terms of higher LSRV at elevated temperature, and lower cost.

SUMMARY OF THE INVENTION

The present invention addresses these problems by providing, in a first aspect, a wellbore fluid comprising water, a glucomannan additive and at least one other component selected from the group comprising a rheology modifier, fluid loss control agent, inorganic or organic salt, dispersant, shale stabilizer or inhibitor and weighting agent.

In one or more embodiments, the wellbore fluid is a water-based wellbore fluid.

In further embodiments, the wellbore fluid may be selected from the group comprising a drilling fluid, a completion fluid, a packer fluid, a viscous plug fluid and a workover fluid.

The glucomannan additive is a water-soluble polysaccharide, which is non-ionic. Glucomannan exhibits a differentiating rheological performance in a wellbore fluid which is controllable both before and after aging, particularly at typical bottom hole temperatures thus overcoming the problems described above. In one embodiment, the glucomannan additive is present in the wellbore fluid in a composition in the range of from 0.1 to 50 ppb (lbm/bbl), more typically in the range of from 1 to 10 ppb, still more typically in the range of from 2 to 8 ppb. In one embodiment, the glucomannan additive comprises konjac glucomannan. The glucomannan can perform a variety of functions in the wellbore fluid. The glucomannan may function as one or more of the group comprising a rheology modifier, a fluid loss control agent, such as a gel-forming additive, and a shale inhibitor.

The wellbore fluid as described herein requires the presence of at least one other component i.e. in addition to water and a glucomannan additive. Consequently, the at least one other component does not comprise glucomannan e.g. when one or more of a rheology modifier, a fluid loss control agent and a shale inhibitor are present as the at least one other component in the fluid, the modifier, agent and/or inhibitor is not glucomannan.

In certain embodiments, the wellbore fluid comprises at least two, sometimes at least three, of the other components selected from the group comprising rheology modifier, fluid loss control agent, inorganic or organic salt, dispersant, shale stabilizer or inhibitor and weighting agent.

Glucomannan has been found to be synergistic with a wide range of rheology modifiers and blends in wellbore fluids. In particular, glucomannan exhibits a synergistic rheological performance when used in combination with polysaccharide rheology modifiers, such as xanthan, especially at low shear rates after aging. Glucomannan may therefore be substituted for high price products such as the xanthan gum to provide blends with superior rheological properties at reduced cost.

Thus, in one embodiment, the wellbore fluid further comprises a polysaccharide additive other than glucomannan. As glucomannan is also a polysaccharide, it should be understood that the term "polysaccharide additive" does not include the glucomannan additive. The ratio of glucomannan additive to polysaccharide additive, such as xanthan, may be in the range of from 1:4 to 4:1 by weight i.e. 20-80 wt. % glucomannan additive and 80-20 wt. % polysaccharide additive, based upon the total weight of glucomannan additive and polysaccharide additive. More typically, the ratio of glucomannan additive to polysaccharide additive may be in the range of from 1:1 to 7:3 by weight i.e. 50-70 wt. % glucomannan additive and 50-30 wt. % polysaccharide additive, based upon the total weight of glucomannan additive and polysaccharide additive. The glucomannan additive and polysaccharide additive may be present in the range of from 1 to 10 ppb, still more typically in the range of from 2 to 8 ppb, yet more typically at about 5 ppb.

Glucomannan is a very effective shale inhibitor and stabilizer, particularly for water-swellable clay formations, and even at low concentrations. Without wishing to be bound by theory, it is postulated that because the polymer is reactive to changes in pH and temperature, the mechanism for inhibition is associated with the ability of the polymer to water block and reduce pore pressure transmission at the near wellbore.

Weighted formulation wellbore fluids comprising glucomannan exhibit similar performance characteristics to those of many formulations and the glucomannan is compatible with other additives, such as polyanionic cellulose fluid loss reducers.

In a further aspect, a method of forming a gel plug suitable for a subterranean hole is provided, the method comprising at least the steps of:

providing a wellbore fluid as described herein;

deacetylating the glucomannan additive in the wellbore fluid to form a gel plug.

Typically, the action of heat improves the rate of the deacetylation process. The heat which may be employed to form the gel can be provided by the sub-surface temperatures conventionally found in the wellbore. Gel formation can occur at temperatures above 65° C., more typically above 80° C., still more typically above 90° C.

In one embodiment of the method of forming a gel plug, the method further comprises passing the wellbore fluid into a subterranean hole. In a further embodiment, the deacetylating step is achieved by increasing the pH of the wellbore fluid. Typically, the pH of the wellbore fluid is increased to a pH of at least 9. More typically the pH of the wellbore fluid can be increased to a pH in the range of from 9-10. In another embodiment, an alkali such as caustic soda, soda ash, potassium carbonate and/or lime, is added to the wellbore fluid to bring about the deacetylation of the glucomannan. The alkali may be added to the wellbore fluid before it is passed into the wellbore, or after it has been passed into the wellbore, for instance by the injection of a separate fluid into the subterranean hole which would then mix with the wellbore fluid. Typically the separate fluid can be an aqueous solution of the alkali.

In another aspect, a method of modifying the properties of a wellbore fluid is provided, the method comprising at least the steps of:

providing a fluid comprising water and at least one other component selected from the group comprising a rheology modifier, fluid loss control agent, inorganic or organic salt, dispersant, shale stabilizer or inhibitor and weighting agent; and mixing a glucomannan additive with the fluid.

In one embodiment of the method of modifying the properties of a wellbore fluid, the glucomannan additive modifies the rheology of the wellbore fluid.

The glucomannan additive disclosed herein is especially useful as a component in wellbore fluids for subterranean oil and gas wells. Thus, in a further aspect, the use of glucomannan as a wellbore fluid additive is provided. In one embodiment, the glucomannan is used as a rheology modifier. In another embodiment, the glucomannan is used as a fluid loss control agent, such as a gel-forming additive. In a further embodiment, the glucomannan is used as a shale inhibitor.

In a further aspect, a method of drilling a subterranean hole with a wellbore fluid is provided, the method comprising at least the steps of:

forming a wellbore fluid as described herein by mixing water, a glucomannan additive and at least one other component selected from the group comprising a rheology modifier, fluid loss control agent, inorganic or organic salt, dispersant, shale stabilizer or inhibitor and weighting agent; and drilling a subterranean hole using said wellbore fluid.

The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling. Specific formulations may depend on the state of drilling a well at a particular time, for example, depending on the depth and/or the composition of the formation, as will be appreciated in the art.

DETAILED DESCRIPTION

Embodiments of the invention will now be described by way of example only, and with reference to the accompanying non-limiting drawings in which.

Figure 9:
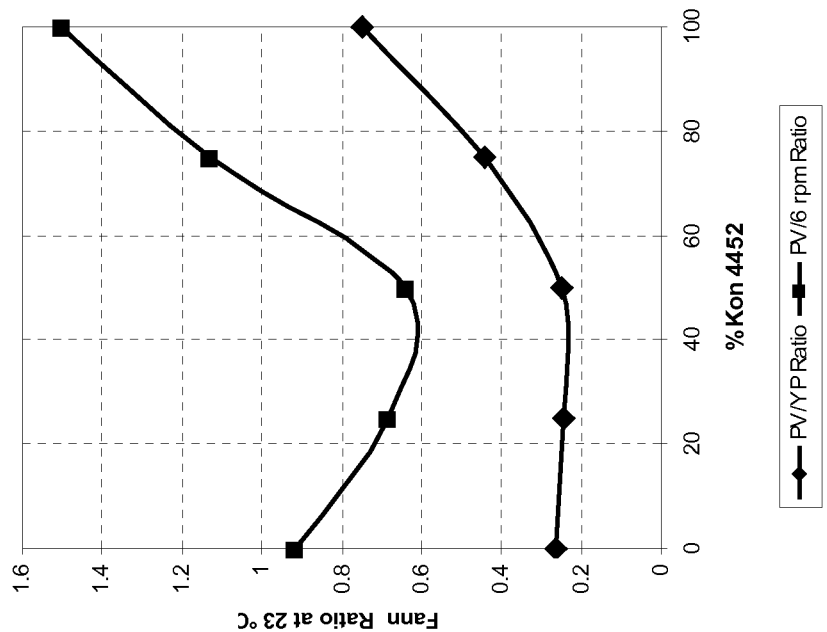
Figure 8:
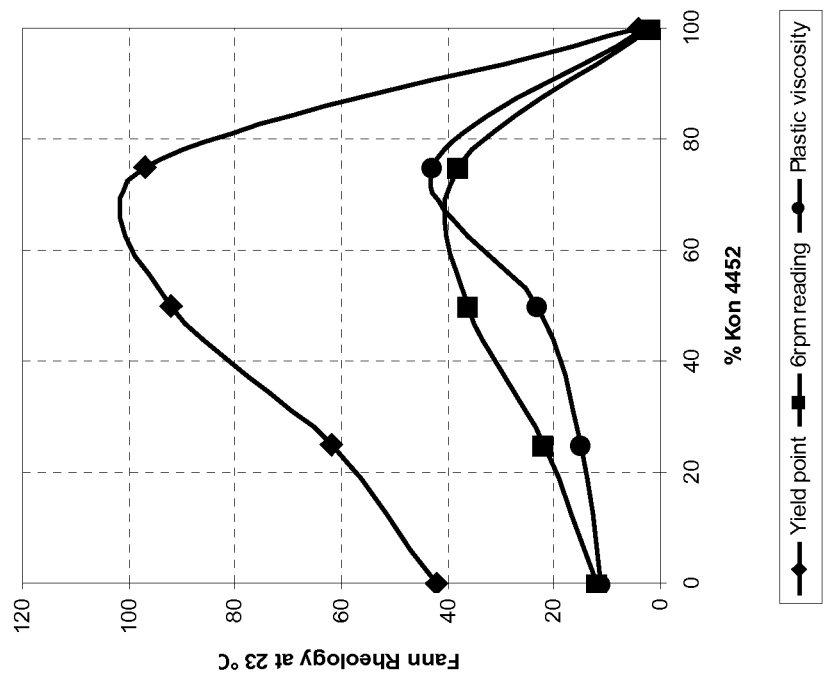

FIG. 8 shows the rheology profiles for yield point, plastic viscosity and low shear (6 rpm), after aging, of fluids containing konjac glucomannan (Kon 4452), xanthan gum (DUOVIS) or blends of konjac glucomannan and xanthan gum at different concentrations with soda ash as described in Example 8; and FIG. 9 shows the rheology profiles for the ratio of plastic viscosity to yield point and plastic viscosity to low shear (6 rpm), after aging, of fluids containing konjac glucomannan (Kon 4452), xanthan gum (DUOVIS) or blends of konjac glucomannan and xanthan gum at different concentrations with soda ash described in Example 8.

The wellbore fluid described herein comprises water, a glucomannan additive and at least one other component selected from the group comprising a rheology modifier, fluid loss control agent, inorganic or organic salt, dispersant, shale stabilizer or inhibitor and weighting agent.

As used herein, the term 'wellbore fluid' is used synonymously with the term 'wellbore mud', such that they are intended to have the same meaning. Similarly, the terms 'drilling fluid' and 'drilling mud' are also used synonymously.

The wellbore fluid is principally composed of an aqueous solution as the continuous phase. The aqueous-based continuous phase is generally selected from the group comprising fresh water, seawater, natural brine solutions, brines formed by dissolving suitable salts in water, mixtures of water and water-soluble organic compounds, and combinations of these and similar compounds that should be known to one of skill in the art. Suitable inorganic salts include chloride and bromide salts of potassium, sodium, calcium, magnesium, zinc, and caesium. Suitable organic salts include acetate and formate salts of potassium, sodium, calcium, magnesium, zinc, and caesium.

The amount of the aqueous-based continuous phase may be sufficient to form a water-based wellbore fluid, such as a drilling fluid. This amount may range from greater than 30 vol. % of the wellbore fluid to less than 100 vol. % of the wellbore fluid. In one embodiment, the amount of the aqueous-based continuous phase is in the range from about 40 vol. % to about 90 vol. % of the wellbore fluid. However, the amount of the aqueous-based continuous phase is preferably greater than 90 wt % of the wellbore fluid.

The wellbore fluid comprises a glucomannan additive. As used herein, the glucomannan additive is a polysaccharide comprised of D-glucose and D-mannose. Glucomannan is non-ionic and is soluble in water. It has a polymer backbone comprising β-(1→4) linked D-mannose and D-glucose. These two sugars may be present in a ratio in a range of 1.4:1 to 1.8:1 respectively, more typically approximately 1.6:1 respectively. A degree of branching may be present, for instance at approximately 8%, and can be through β-(1→6) glucosyl linkages. The constituent sugars on the polymer backbone, particularly the glucose, may be acetylated. The degree of acetylation may be in the range of one acetyl group per 9-19 sugar units.

The acetyl groups on the polymer backbone cause steric hindrance preventing different polymer chains from approaching one another, thereby stopping gelation from occurring. However, under certain conditions, gelation may be induced. For instance, a wellbore fluid comprising the glucomannan additive in an alkaline environment, typically at a pH of greater than or equal to 9, more typically at a pH in the range of from 9-10, can lead to the formation of gel. The gel formed is stable to heating at temperatures as high as 200° C. Consequently, the gel formation can be viewed as irreversible. Without wishing to be bound by theory, alkali conditions are thought to bring about the deacetylation of the acetyl groups of the glucomannan, removing their steric blocking effect. This allows the formation of hydrogen bonds between different polymer chains allowing partial crystallization at the hydrogen bonding sites. The crystals act as nodes producing a gel structure. Such gel structures can be suitable for applications such as water shut off and may have consolidating properties for formation, particularly if they are formed in-situ in the near-wellbore.

Glucomannan is known as a food additive where it is used as an emulsifier and thickener. The use of glucomannan in foods is described in U.S. Pat. No. 3,928,322. Glucomannan comprises about 40% by dry weight of the konjac plant and when derived from the konjac plant it is known as konjac or konjac glucomannan. As a food additive, konjac glucomannan is known as Konjac Powder and as E425 (i) under the European food additive classification. It is commercially available, for instance from Thew Arnott & Co. Ltd., Wallington, Surrey, UK as Konjac Gum/resin E425 and Kon 4452.

Glucomannan additives such as Kon 4452 exhibit unusual rheological properties which make them suited either for use in wellbore fluids alone or in blends combined with other, possibly more costly, additives. Cost reductions and synergistic advantages are possible with other polysaccharides and additives. The wellbore fluid comprising the glucomannan additive can be tailored, due to its chemically reactive composition, to produce a variety of unusual gel structures. Many such advantageous properties can be exhibited under conditions which are easily engineered, as discussed in further detail below.

A variety of components or additives may be added to the wellbore fluid in order to achieve different desired fluid properties. Wellbore fluids can be formulated to include one or more rheology modifiers, such as viscosifying agents, to impart desired rheological properties to the fluid. In general, rheology modifiers are typically polymeric additives such as natural and synthetic polymers like polysaccharides and polysaccharide derivatives. Examples of suitable viscosifying agents include starches, scleroglucans, guar gums, polyacrylates, xanthan gum, as well as combinations of these compounds.

As well as rheological modifiers, polymeric additives, especially organic polymers, can also control filtration rates, which may be related to the degree of flocculation and aggregation of clay particles in the wellbore fluids (particularly drilling muds). Fluid loss control properties can be affected by the formation of a deflocculated and thin filtercake on the wellbore formation, resulting from a well-dispersed clay suspension. Suitable polymers include guar gums, xanthan gum, wellan gum and biopolymers such as alginate, carrageenan, and scleroglucan, starches, cellulose ethers, lignite and lignosulfonate, and synthetic polymers such as polyacrylates and polyacrylamides.

Furthermore, clays may be used to increase the viscosity of wellbore fluids. Typically, smectite type clays, such as montmorillonites (bentonite) are used, as well as attapulgite, sepiolite and saponite. The amount of clay, typically present as finely divided clay particles, used in wellbore fluids can be determined by the properties of the borehole. The clays may be used in combination with polymeric additives in the general range of a lower limit of about 1.0 ppb (lbm/bbl) based on the total volume of the fluid, more typically about 3.0 ppb (lbm/bbl), and still more typically 5.0 ppb (lbm/bbl). The upper limit of the clay is about 50.0 ppb (lbm/bbl), more typically 20.0 ppb (lbm/bbl), and still more typically 10.0 ppb (lbm/bbl) based on the volume of the total fluid.

It may also be desirable to add components to the wellbore fluid to help control fluid loss. Fluid loss control agents such as starches, celluloses, and other polysaccharides may be added to the wellbore fluid to keep the wellbore fluid from entering the subterranean formation, while allowing the wellbore fluid to be maintained at a pressure greater than that of the formation. Examples of suitable fluid loss control agents include polyanionic cellulosic polymer (PAC) carboxymethylcellulose (CMC), chemically modified starches, mixtures of these and the like.

Wellbore fluids typically also contain a weighting agent in order to provide sufficient density to the fluid, for instance for drilling purposes, and to prevent kick-backs and blow-outs during drilling operations. Weighting agents for use herein may be generally selected from any type of weighting materials used in wellbore fluids. Suitable weighting agents include barite, hermatite, iron oxide, calcium carbonate, alkali halides, alkaline earth halides, magnesium carbonate, zinc halides, zinc formates, zinc acetates, caesium halides, cesium formates, caesium acetates, and other known organic and inorganic salts, mixtures and combinations of these compounds.

The wellbore fluid described herein may also include a shale stabilizer or inhibitor such as glycols and polyamines. Examples of suitable shale inhibitors include glycol ether, for example GLYDRIL MC, a product commercially available from M-I SWACO L.L.C., Houston, Tex., and partially-hydrolyzed polyacrylamide (PHPA).

The wellbore fluid described herein may also be formulated to include dispersant. As used herein, the term 'dispersant' is intended to include those materials which are used to break up the flocculated clumps by separating aggregated or stacked sheets of clay during drilling operations, as well as deflocculents and thinners. The main objective of using these additives is to reduce the gel strength and yield value resulting from clay aggregates. Different types of useful dispersants are used in the oil industry such as, but not limited to, lignite, causticized lignite, causticized potassium lignite, chrome lignite, chrome lignosulfonate, ferrochrome lignosulfonate, chrome-free lignosulfonate, tannin and modified chrome tannin, low molecular weight polyacrylates, sodium tetraphosphate, sodium pyrophosphate, and sulfonated synthetic polymers. Typically thinners may be added to reduce flow resistance, control gelation tendencies, counteract the effects of salts, and stabilize fluid properties. Suitable thinners include lignosulfonates, modified lignosulfonates, polyphosphates, tannins, and low molecular weight polyacrylates and polyanionic celluloses.

The alkalinity and the salinity of the fluid may affect the choice of dispersant. For example, polyphosphates, tannin and lignin thinners are not very effective in the presence of flocculating concentrations of salts due to potential precipitation. These materials may therefore be used principally in freshwater-based systems along with sodium hydroxide to form a soluble salt. Chrome lignosulfonates are beneficial because they can be used in freshwater and saline-based fluids, particularly those having a high pH value.

Other additives that are frequently present in wellbore fluids of the present invention include one or more further additives selected from the group comprising an emulsifier, shale encapsulation agent, lubricants, penetration rate enhancer, defoamer, stabilizer, scavenger, bactericide, corrosion inhibitor, wetting agent, surfactant, interfacial tension reducer, pH buffer, mutual solvent, cleaning agent and loss circulation product. Such additives should be known to one of ordinary skill in the art of formulating wellbore fluids.

Wellbore fluids containing a glucomannan additive were tested for the enhancement of or the replacement of other rheological additives, such as xanthan gum polymer in wellbore fluids. The wellbore fluid system examined is an unweighted freshwater fluid with no additional solids such as clay. The following Examples show the benefits, in terms of performance, from such products.

Example 1

This example compares the initial performance of dispersions of xanthan gum and konjac glucomannan at different concentrations and pH.

Dispersions of a xanthan gum (DUOVIS, M-I SWACO) and Konjac glucomannan (Kon 4452, Thew Arnott) at concentrations of between 3.0 and 5.0 ppb in freshwater were prepared on a Heidolph type STI paddle mixer at room temperature with a mixing time of over 30 minutes. The dispersions were left to stand at room temperature for two to three hours and then remixed. Table 1 shows the rheology as measured by a Fann 35 viscometer at 23° C. for freshwater dispersions as prepared, and also after adjustment of the pH to approximately 10.5 with caustic soda.

The rheology tests were conducted in accordance with the procedures in API Bulletin RP 13B-1, 1990 'Recommended Procedure for Field Testing Water-Based Muds'. The following abbreviations are used to describe the results of experimentation. "PV" is plastic viscosity which is one variable used in the calculation of viscosity characteristics of a drilling fluid, measured in centipoises units [cP]. "YP" is yield point, which is another variable used in the calculation of the viscosity characteristics of drilling fluids, measured in pounds per 100 square feet [lb/100 ft$^2$]. "6-rpm" & "3-rpm" are dial readings on a Fann 35 Viscometer that indicate the viscosity of the drilling fluid at these low shear rates. Gels are recorded as the maximum 3 rpm reading after 10 seconds/10 minutes static, respectively, again in units of lb per 100 square feet [lb/100 ft$^2$].

TABLE 1

Properties of xanthan gum and konjac glucomannan fluids

| | Xanthan gum | | Konjac glucomannan | | | |
|---|---|---|---|---|---|---|
| | 3 ppb | 4 ppb | 4 ppb | 5 ppb | 4 ppb** | 5 ppb** |
| 600 rpm | 40 | 57 | 248 | >300 | 242 | >300 |
| 300 rpm | 32 | 45 | 202 | >300 | 198 | 297 |
| 200 rpm | 28 | 39 | 177 | 278 | 175 | 268 |
| 100 rpm | 20 | 32 | 137 | 229 | 138 | 222 |
| 6 rpm | 8 | 17 | 33 | 68 | 34 | 65 |
| 3 rpm | 7 | 15 | 20 | 45 | 22 | 43 |
| PV* | 8 | 12 | 46 | — | 44 | — |
| YP* | 24 | 33 | 156 | — | 154 | — |
| Gels | 9/10 | 15/17 | 20/20 | 42/44 | 22/23 | 42/43 |
| pH | 7.08 | 10.8 | 6.4 | 6.3 | 10.5 | 10.5 |

*PV is plastic viscosity; YP is yield point
**pH adjusted with caustic soda

The results shown in Table 1 indicate that konjac glucomannan develops much higher shear-thinning rheology than xanthan gum. It is also apparent that increasing the pH of the konjac glucomannan dispersion prior to aging has little effect on the rheology.

Figure 1:
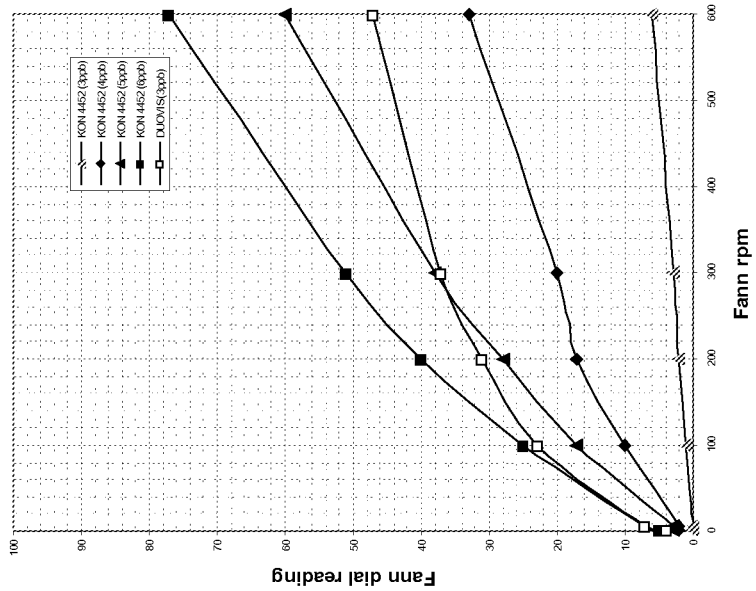
FIG. 1 shows the rheology profiles at 23° C. plotted from the viscosity data of Table 1 below for the dispersions containing caustic soda (NaOH) and xanthan gum (DUOVIS) or konjac glucomannan (Kon 4452) at different concentrations.

FIG. 1 plots the viscosity data of the 3 ppb xantham gum fluid and varying concentrations of konjac glucomannan fluids containing caustic soda and clearly presents the differences in rheology profile between xanthan gum and konjac glucomannan.

Example 2

This example compares the performance of dispersions of konjac glucomannan and xanthan gum after aging.

Dispersions of konjac glucomannan (Kon 4452, Thew Arnott) at concentrations between 3.0 and 6.0 ppb and xanthan gum (DUOVIS, M-I SWACO) at a concentration of 3.0 ppb were prepared in freshwater and the pH adjusted to the range of from 10 to 11 with caustic soda as described in Example 1.

The dispersions were then aged at 93° C. for 16 hours by hot rolling in a pressurized cell. The konjac glucomannan fluids initially treated with caustic soda all gave gel and free water fractions after ageing at 93° C. The gel was readily mixed into the bulk of the fluid with a Silverson type LR4 mixer, fitted with a water-based mixing head. After mixing for 5 minutes the rheology of the fluids was determined at temperatures between 23 and 80° C. using a Fann 35 viscometer.

Figure 2:
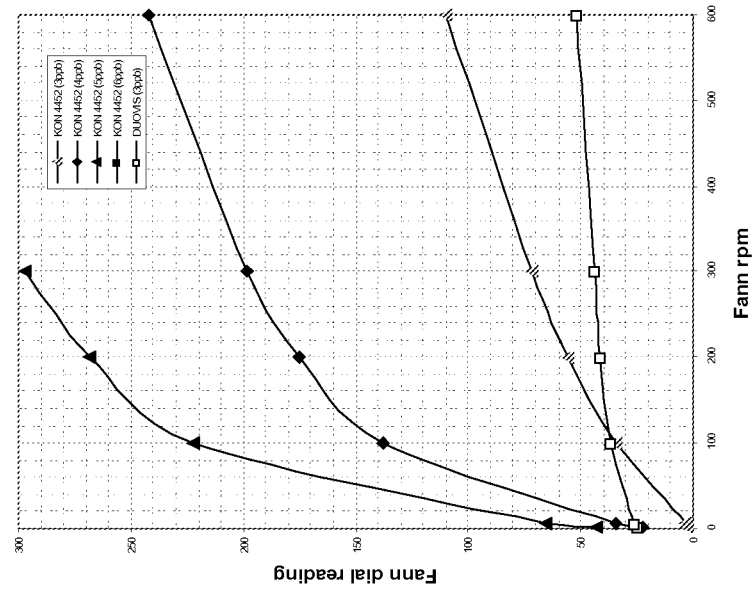
FIG. 2 shows a plot of the rheology profiles at 23° C., after aging, of fluids containing konjac glucomannan (Kon 4452) at various concentrations compared to a fluid containing 3.0 ppb xanthan gum (DUOVIS) as described in Example 2.

FIG. 2 shows the rheology profiles, measured at 23° C., of the fluids containing konjac glucomannan and the fluid containing 3.0 ppb xanthan gum after aging and then mixing.

The konjac glucomannan fluids so treated provided shear thinning fluids comparable with the xanthan gum fluid. Furthermore, the konjac glucomannan fluids have relatively high 6 rpm readings at higher temperatures and more temperature stable low shear rate in comparison to the 3.0 ppb xanthan gum polymer fluid.

Example 3

This example shows the effect of alkalinity on fluids having a concentration of konjac glucomannan of 6.0 ppb.

A bulk dispersion of konjac glucomannan (Kon 4452, Thew Arnott) was prepared as described in Example 2. One laboratory barrel batches of this fluid were treated with various bases (Sigma Aldrich) providing a source of alkalinity including soda ash (sodium carbonate), potassium carbonate and lime (calcium hydroxide) at a concentration of 1.0 ppb and caustic soda at trace levels. The fluids, together with an untreated fluid, having a concentration of konjac glucomannan of 6.0 ppb, and a 3 ppb xanthan gum fluid (DUOVIS, M-I SWACO) treated with caustic soda to provide a pH of 10.4, were hot-rolled at 93° C. for 16 hours. After cooling, the fluids were inspected and mixed for 5 minutes using a Silverson type LR4 mixer fitted with a water-based fluid mixing head to give a homogeneous fluid. The pH was determined with a Denver Instrument Basic pH meter and the Fann 35 rheology determined between 23 and 80° C.

Table 2 shows the pH after hot rolling together with a description of the fluid before mixing.

TABLE 2

Effect of alkalinity on heat-treated konjac glucomannan fluids

| Alkalinity | None | Caustic soda | Soda ash | Potassium carbonate | Lime |
| --- | --- | --- | --- | --- | --- |
| Concentration | — | trace | 1.0 ppb | 1.0 ppb | 1.0 ppb |
| pH before heat aging | 6.3 | 10.7 | 10.8 | 10.8 | 12.1 |
| pH after heat aging | 5.7 | 6.4 | 9.7 | 9.8 | 12.2 |
| Fluid appearance after heat aging | Thin fluid, foam. | Gel and free water. Foam subsided on mixing. | Strong gel and free water. | Strong gel and free water. | Granular gel and free water. Foam subsided on mixing. |

The effect of alkalinity on the fluid rheology is significant. The fluid left untreated produced no observable gel and generated no significant rheology after ageing even at a 6 ppb concentration of konjac glucomannan. After the addition of alkali and aging, the fluids containing glucomannan produced gels. The nature of the gel can be varied by changing the nature and strength of the alkalinity source and the time and temperature of exposure of the fluid to produce different effects in the wellbore. Fluids treated with soda ash or potassium carbonate gave gels that easily mixed into the bulk and gave lower plastic viscosities than those from caustic soda. The lime-treated fluid gave a stronger, more granular, type of gel which mixed less easily into the bulk giving rise to a small but measurable low shear profile. The fluid containing xanthan gum did not produce a gel after alkali addition and aging, but did produce an increase in low end rheology.

The lime-treated fluid, which had the highest pH, produced the lowest plastic viscosities. The low shear rate for all of these fluids provided significantly improved temperature stability up to 80° C. compared to the fluid comprising the xanthan gum polymer. Furthermore, soda ash was seen to be a suitable buffer for the development of aged rheology with konjac glucomannan.

Example 4

This example shows the effect of concentration of konjac glucomannan on gel formation.

Freshwater fluids were prepared as discussed in the previous Example, but with differing higher concentrations of konjac glucomannan (Kon 4452, Thew Arnott). The pH of the fluids were adjusted to 9-10 with caustic soda and then aged by hot rolling for 16 hours at 93° C. The fluids produced contained large amounts of gel with approximately 15% by volume free fluid. The gel was dispersed to form homogeneous viscous fluids by mixing on a Silverson type LR4 mixer fitted with a large round-hole head. The rheological properties of the aged and mixed fluids were then measured at temperatures between 23 and 70° C. on a Fann 35 viscometer.

Figure 3:
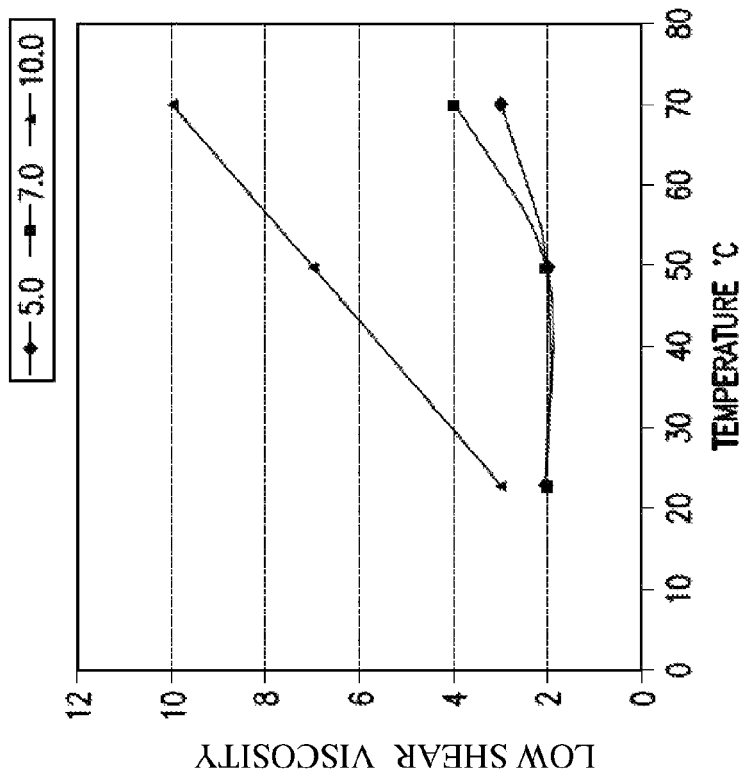
FIG. 3 shows a plot of the plastic viscosity versus temperature, after aging, of fluids containing konjac glucomannan (Kon 4452) at different concentrations with caustic soda as described in Example 4.
Figure 4:
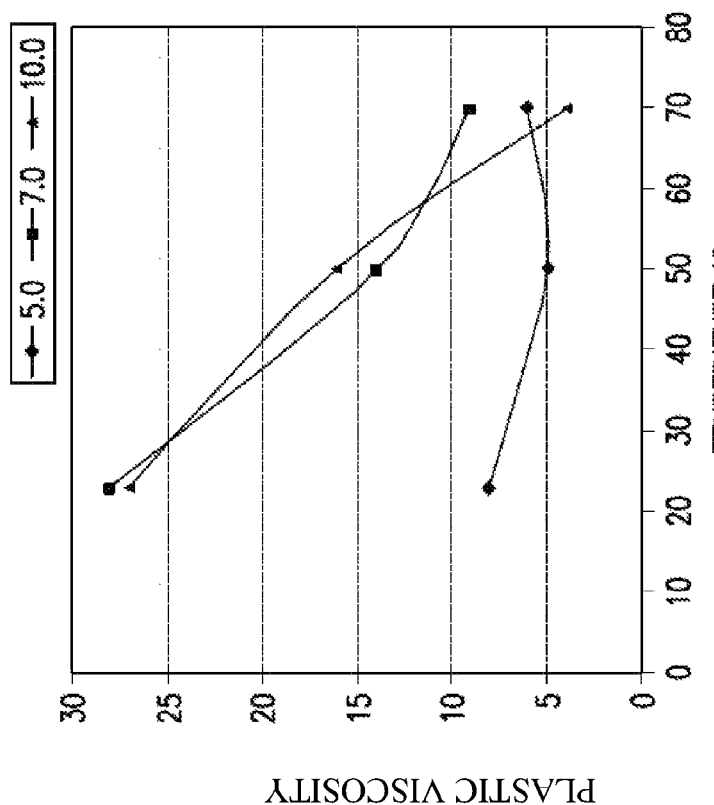
FIG. 4 shows a plot of the low shear viscosity (6 rpm) versus temperature, after aging, of fluids containing konjac glucomannan (Kon 4452) at different concentrations with caustic soda as described in Example 4.

FIGS. 3 and 4 show the variation of plastic viscosity and 6 rpm reading versus temperature respectively. It is apparent from FIG. 4 that low-end rheology increases appreciably at a concentration of 10 ppb Kon 4452. This indicates a critical gel concentration in the range of from 7 to 10 ppb after aging of the fluid comprising glucomannan additive, after the addition of alkali. The rheology also increases with temperature after aging, indicating the formation of thermo-stable gel structures within the temperature range investigated.

The experiment of Example 4 was also repeated for the fluid having a concentration of Kon 4452 of 7 ppb, with the replacement of the caustic soda with soda ash as the alkali and the addition of potassium chloride at a concentration of 30 ppb. Although not shown in the Figures, the rheological profiles were similar to those obtained with the caustic soda alkali. However, the presence of the potassium chloride produced an increase in the rheology compared to the fluid without the brine. Large amounts of gel were visible together with free fluid. A gel structure was produced at high temperature and remained stable on cooling, indicating that a thermostable gel was formed. A similar brine containing fluid without the addition of any alkali, which had an unadjusted pH of 6.7, produced virtually no gel structure and negligible rheology after aging.

Example 5

This example shows the effect of aging temperature on gel formation in a fluid comprising a konjac glucomannan additive.

Fluids comprising Kon 4452 at a concentration of 5 ppb were prepared in fresh water and soda ash added to a concentration of 1 ppb. The alkali-treated fluid was then aged for 16 hrs by hot-rolling at one of three temperatures: 65, 93 or 122° C. The fluid aged at 65° C. was found to contain small discrete gel particles after cooling. The fluid aged at 122° C. was found to contain large lumps of gel which were easily separated by a coarse screen but could still easily be re-dispersed into the bulk of the fluid. Thus, gel formation in fluids comprising a glucomannan additive starts to occur under alkaline conditions at temperatures as low as 65° C., but more effectively at 93° C., which are typical of bottom-hole temperatures found in many wells.

Example 6

This example determines the strength of gel plugs formed from a fluid comprising a konjac glucomannan additive.

A fluid comprising freshwater having 10 ppb konjac glucomannan (Kon 4452, Thew Arnott), above the critical gel concentration, was prepared and treated with 1 ppb soda ash and then aged for 16 hrs at 93° C. in a similar manner to the procedure of Example 3. The gel plug formed was cut into slices and three penetrometer tests were run on three separate sections using a Stevens Mechtric QTS 25 Penetrometer fitted with a 1.2 mm diameter flat probe and carried out at a constant speed of 30 mm/minute. The average gradient was determined between 0.5 and 6 mm penetration to give a surface hardness value. The load at 2.5 mm penetration and the maximum at the end of the test was also recorded and converted to a pressure. The results are shown in Table 3.

TABLE 3

Penetrometer test results for gel plugs produced from fluids comprising konjac glucomannan

| Test | Average gradient/gs$^{-1}$ | Surface hardness/gmm$^{-1}$ | Load at 2.5 mm/kPa | Max. recorded load/kPa |
|---|---|---|---|---|
| 1 | 147 | 294 | 43.4 | 169.6 |
| 2 | 32 | 64 | 22.1 | 44.8 |
| 3 | 121 | 242 | 44.8 | 717.0 |

Two of the three tests exhibited an increasing gradient with time and penetration suggesting an elastic gel structure. The maximum load sustained in the test procedure was over 100 psi (689 kPa), which is significant for an unweighted water-based fluid. In addition, the strength is comparable to conventional crosslinked polymer or silica gel systems used for water blocking e.g. well shut-off and pore pressure isolation in borehole/shale stabilization applications.

Example 7

This example shows the inhibition of shale formation by a fluid comprising a konjac glucomannan additive.

Fluids were prepared from freshwater and a konjac glucomannan additive (Kon 4452, Thew Arnott). The fluids were treated with caustic soda to provide a pH in the range of from 9 to 10 and the fluids were then aged for 16 hours by hot-rolling at a temperature of 65° C. The temperature of 65° C. (150° F.) is a standard temperature for carrying out shale inhibition tests and is lower than that used in the aging treatment. Under these conditions i.e. at concentrations of Kon 4452 below about 5 ppb, it was found that any gel generated had minimal effect on the bulk viscosity observed.

Following this, inhibition tests were performed at additive concentrations of between 1 and 5 ppb in an inhibitive 30 ppb potassium chloride brine having an Oxford clay substrate made from cuttings in the range of 2 to 4 mm. This was compared to a control fluid comprising the base brine as well as a reference fluid consisting of Idcap D (M-I SWACO), a polyacrylamide-based shale inhibitor, at a concentration of 3 ppb.

Figure 5:
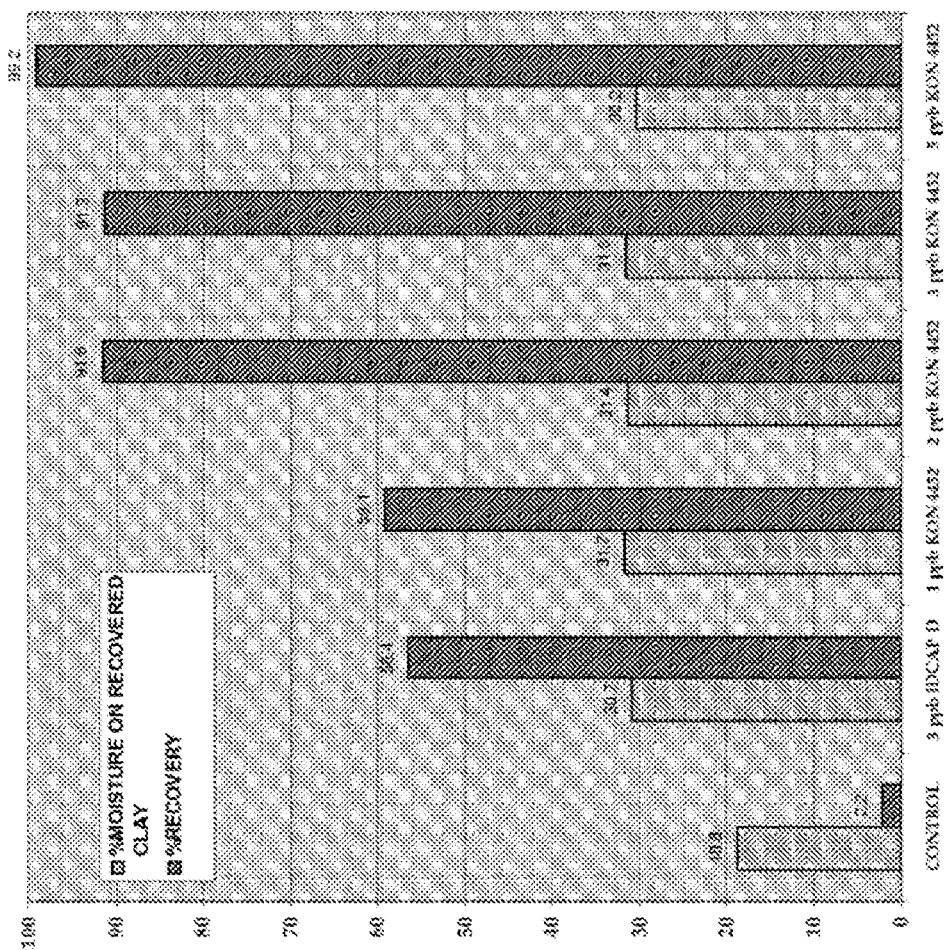
FIG. 5 shows a graph of the percent recovery of Oxford clay and the percent moisture on the recovered clay, after aging, of fluids containing konjac glucomannan (Kon 4452) at different concentrations with caustic soda and KCl brine as described in Example 7.

FIG. 5 shows a graph of percentage shale recovery and percentage moisture on the recovered clay for a range of concentration of Kon 4452 additive in a fluid for an Oxford clay substrate. Fluids comprising Kon 4452 additive produced a high degree of shale inhibition with Oxford clay. Recoveries of greater than 90 wt. % were achieved at konjac glucomannan concentrations of 2 ppb or above. The performance was comparable to that of the reference additive at only a third of its concentration. Without wishing to be bound by theory, it is postulated that konjac glucomannan acts as a shale inhibitor by a similar mechanism to other systems containing for example, silica gels, i.e., by inhibition of the swelling and disintegration of the shales by water blocking. There may also be a degree of encapsulation occurring which is typical of a high molecular weight polymer.

The Kon 4452 additive was effective at shale inhibition at a concentration in the range of from 2 to 3.3 ppb, which maintains a low initial rheology. Any gel particles formed and not interacting with the shale formation would be readily dispersed during drilling.

Example 8

This example shows the performance of fluids comprising one or both of xanthan gum and konjac glucomannan, and in particular the synergistic effects observed in fluids comprising both xanthan gum and konjac glucomannan.

Bulk dispersions of xanthan gum (DUOVIS, M-I SWACO) and konjac glucomannan (Kon 4452, Thew Arnott) were prepared as described previously at 5.0 ppb. A series of blends of these two components at 25 wt. %, 50 wt. % and 75 wt. % konjac glucomannan were prepared, together with batches of 100 wt. % konjac glucomannan and 100 wt. % xanthan gum. The dispersions were treated with 1.0 ppb soda ash and then aged by hot rolling for 16 hours at 93° C. After cooling, the fluids were remixed for 5 minutes on a Silverson type LR4 mixer and the rheology determined with a Fann 35 viscometer between 23 and 80° C. The API fluid loss was also determined for each product in accordance with API 13B-1, Recommended Procedure for Field Testing Water-Based Muds.

Figure 7:
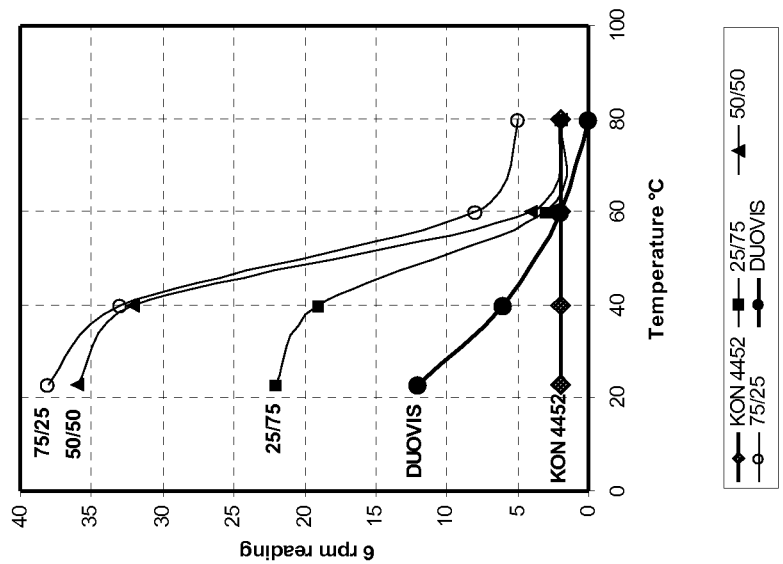
FIG. 7 shows a plot of the low shear viscosity (6 rpm) versus temperature, after aging, of fluids containing konjac glucomannan (Kon 4452), xanthan gum (DUOVIS) or blends of konjac glucomannan and xanthan gum at different concentrations with soda ash as described in Example 8.
Figure 6:
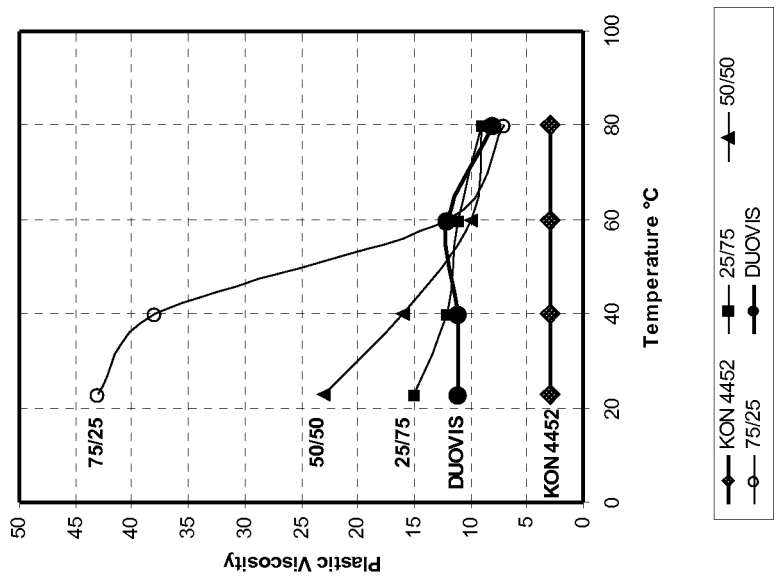
FIG. 6 shows a plot of the plastic viscosity versus temperature, after aging, of fluids containing konjac glucomannan (Kon 4452), xanthan gum (DUOVIS) or blends of konjac glucomannan and xanthan gum at different concentrations with soda ash as described in Example 8.

Table 4 lists the API fluid loss and pH for each fluid after ageing. FIGS. 6 and 7 show the rheological performance of the fluids over the temperature range 23-80° C., in terms of the plastic viscosity and viscosity at 6 rpm respectively.

TABLE 4

API Fluid Loss performance for konjac glucomannan/xanthan gum blends after aging

| | % Kon 4452 | | | | |
|---|---|---|---|---|---|
| | 0 | 25 | 50 | 75 | 100 |
| | % Duovis | | | | |
| | 100 | 75 | 50 | 25 | 0 |
| pH after heat aging | 9.34 | 9.50 | 9.70 | 9.89 | 9.78 |
| API (ml) | No Control | 18.0 | 15.5 | 16.0 | 24.5 |

FIGS. 8 and 9 show the effect of product ratio with a total product concentration of 5.0 ppb on the rheological parameters and on the ratio of high-to-low shear readings i.e. plastic viscosity/yield point and plastic viscosity/6 rpm ratios respectively.

A strongly synergistic performance was observed between konjac glucomannan and xanthan gum after ageing and alkalinity treatment in blends with composition 25-75 wt. % konjac glucomannan. Increases in low shear rate viscosity (LSRV) were observed, over xanthan gum fluids, of about 1.8 and 2.5 for 25 wt. % and 50 wt. % blends, respectively. 100 wt. % konjac glucomannan exhibited virtually no LSRV under these conditions, despite the visible gel formed after ageing being redispersed. This indicates that the amount of gel is below the critical concentration for gel formation in the bulk fluid.

Indications are that synergistic blends of konjac and xanthan gum could lead to up to 20% reduction in cost of total viscosifier for an equivalent or improved performance compared to xanthan alone.

The API fluid loss data suggest that improved fluid loss performance would result from blending glucomannan with the xanthan gum polymer.

FIGS. 8 and 9 indicate that the synergy maxima for LSRV lies at about 60% Kon 4552 composition by weight, but that up to at least 50 wt. % Kon 4452 LSRV is not obtained at the expense of an increase in plastic viscosity; because the plastic viscosity/6 rpm ratio was found to decrease progressively up to this ratio. The optimum blend ratio is also likely to depend on the appearance of the fluid. High levels of konjac glucomannan in a blend may lead to separation of thermostable gels upon aging. However, in compositions with 25 wt. %, and even 50 wt. % glucomannan, more homogeneous fluids were observed immediately after ageing at 93° C.

The performance of Kon 4452 indicates that konjac glucomannan may be particularly effective in the form of a blend with xanthan gum polymer. High levels of konjac glucomannan may exhibit high initial rheology on make up, so the blend ratio will depend upon the required performance and properties of the fluid and the proposed method of application during drilling.

Example 9

This example provides two medium weighted inhibitive wellbore fluid formulations comprising konjac glucomannan, with high and low fluid viscosity respectively. The konjac glucomannan is added at low concentration as the shale inhibitor, not primarily as a viscosifier.

The compositions of the two formulations of water based wellbore fluids are shown in Table 5 below. KCl is used as a stabilizer, especially for shales. Kon 4452 (Thew Arnott) is a konjac glucomannan. DUOVIS (M-I SWACO) is a xanthan gum polymer. Polypac ELV (M-I SWACO, UK) is a low viscosity polyanionic cellulose polymer which is a fluid-loss additive. API Barite (M-I SWACO) is a weighting agent. Both fluid formulations have a similar concentration of the konjac glucomannan additive based on the total fluid volume of at about 1.5-2.0 ppb.

TABLE 5

Weighted inhibitive wellbore fluid formulations

| | Low viscosity formulation/ ppb | High viscosity formulation/ (ppb) |
|---|---|---|
| Freshwater | 288 | 287 |
| KCl | 30 | 30 |
| Duovis | 0.75 | 2 |
| Kon 4452 | 1.5 | 2 |
| Polypac ELV | 0 | 2 |
| API Barite | 205 | 204 |

Table 6 shows the properties of the two wellbore fluid formulations, before and after aging by hot-rolling at 93° C. for 16 hours. The low viscosity fluid had a 6 rpm Fann 35 viscometer reading of less than 15 at 50° C. before heat treatment. A similar reading was achieved by the high viscosity formulation after aging. The latter fluid had a higher loading of xanthan gum polymer and a fluid loss additive.

It is apparent that the aging of both fluid formulations results in a significant drop in viscosity. The rheology is strongly dependent upon the concentration of the xanthan gum polymer (DUOVIS) present. Such a rheology decrease could be easily off-set, for instance by the addition of further xanthan gum or konjac glucomannan additive to the fluid during drilling. The addition of further glucomannan additive is preferred because it would maintain the level of inhibition.

TABLE 6

Properties of weighted inhibitive wellbore fluid formulations

| | Low viscosity formulation | | High viscosity formulation | |
|---|---|---|---|---|
| | BHR* | AHR* 93° C. | BHR* | AHR* 93° C. |
| 600 rpm | 94 | 37 | 294 | 99 |
| 300 rpm | 68 | 21 | 242 | 85 |
| 200 rpm | 55 | 16 | 207 | 77 |
| 100 rpm | 40 | 10 | 153 | 62 |
| 6 rpm | 14 | 2 | 47 | 30 |
| 3 rpm | 13 | 1 | 38 | 25 |
| Plastic visc. | 26 | 16 | 52 | 14 |
| Yield point | 42 | 5 | 190 | 71 |

TABLE 6-continued

Properties of weighted inhibitive wellbore fluid formulations

| | Low viscosity formulation | | High viscosity formulation | |
|---|---|---|---|---|
| | BHR* | AHR* 93° C. | BHR* | AHR* 93° C. |
| Gels | 15/60 | 2/2 | 39/57 | 26/30 |
| pH** | 9.1 | 9.2 | 9.2 | 9.3 |
| API/ml | — | n/c | — | 24.0 |
| Weight/kgl$^{-1}$ | | 1.46 | | 1.46 |
| Comment | Some sag but no hard settlement Slight foam easily treated No visible gel | | No sag or settlement No foam or gel 1.5 mm cake thickness Pale slightly viscous filtrate | |

*BHR = 'before hot-rolling'; AHR = 'after hot-rolling'
**pH adjusted with caustic soda The performance of the high viscosity formulation in terms of fluid loss indicates that the konjac glucomannan is compatible with conventional cellulosic fluid loss additives such as Polypac ELV. Furthermore, an acceptable level of sag control was produced once a typical rheological specification was obtained.

The person skilled in the art will understand that the invention can be carried out in many various ways without departing from the scope of the appended claims. For instance, the invention encompasses the combination of one or more of the optional or preferred features disclosed herein.

What is claimed:

1. A wellbore fluid comprising:
   water;
   a glucomannan additive, wherein the glucomannan additive has at least an acetyl group; and
   at least one other component selected from the group consisting of a rheology modifier, fluid loss control agent, inorganic or organic salt, dispersant, shale stabilizer or inhibitor, and weighting agent; and
   further wherein the wellbore fluid does not comprise a crosslinking agent;
   wherein the glucomannan additive forms a gel after deacetylation of the at least an acetyl group under alkaline conditions.

2. The fluid of claim 1, wherein the wellbore fluid is a water-based wellbore fluid.

3. The fluid of claim 1 wherein the glucomannan additive is present in the range of from 0.1 to 50 lbm/bbl.

4. The fluid of claim 1 wherein the glucomannan additive is present in the range of from 1 to 10 lbm/bbl.

5. The fluid of claim 1, further comprising one or more further additives selected from the group consisting of a deflocculant, emulsifier, defoamer, scavenger, bactericide, corrosion inhibitor and lubricant.

6. The fluid of claim 1, wherein the rheology modifier comprises a polysaccharide additive other than glucomannan.

7. The fluid of claim 6, wherein the polysaccharide additive is xanthan gum.

8. The fluid of claim 6, wherein the glucomannan additive and polysaccharide additive are present in the range of from 1 to 10 lbm/bbl.

9. The fluid of claim 6, wherein the ratio of glucomannan additive to polysaccharide additive is in the range of from 1:4 to 4:1 by weight based upon the total weight of glucomannan additive and polysaccharide additive.

10. The fluid of claim 6, wherein the ratio of glucomannan additive to polysaccharide additive is in the range of 1:1 to 7:3 by weight based upon the total weight of glucomannan additive and polysaccharide additive.

11. The fluid of claim 1, wherein the weighting agent is selected from the group consisting of barite, hematite, iron oxide, calcium carbonate, alkali halides, alkaline earth halides, magnesium carbonate, zinc halides, zinc formates, zinc acetates, caesium halides, caesium formates, caesium acetates, and mixtures thereof.

12. The fluid of claim 1, wherein the shale stabilizer is selected from glycol ether or partially hydrolysed polyacrylamide.

13. The fluid of claim 1, wherein the fluid loss control agent is selected from the group consisting of polyanionic cellulosic polymer, carboxymethylcellulose, chemically modified starches, and mixtures thereof.

14. A method comprising:
   providing a wellbore fluid into a wellbore, wherein the wellbore fluid comprises:
   water;
   a glucomannan additive, wherein the glucomannan additive has at least an acetyl group; and
   at least one other component selected from the group consisting of a rheology modifier, fluid loss control agent, inorganic or organic salt, dispersant, shale stabilizer or inhibitor, and weighting agent; and
   further wherein the wellbore fluid does not comprise a crosslinking agent; and
   deacetylating the glucomannan additive in the wellbore fluid to form a gel plug by increasing the pH of the wellbore fluid to a basic pH, wherein the gel plug forms.

15. The method of claim 14 wherein the pH of the wellbore fluid is increased to a pH of at least 9.

16. The method of claim 14, wherein in the deacetylating step, an alkali such as caustic soda, soda ash, potassium carbonate or lime, is added to the wellbore fluid.

17. A method comprising:
   circulating a wellbore fluid in a wellbore, wherein the wellbore fluid comprises:
   water;
   a glucomannan additive, wherein the glucomannan additive has at least an acetyl group; and
   at least one other component selected from the group consisting of a rheology modifier, fluid loss control agent, inorganic or organic salt, dispersant, shale stabilizer or inhibitor, and weighting agent; and
   further wherein the wellbore fluid does not comprise a crosslinking agent;
   wherein the glucomannan additive forms a gel after deacetylation of the at least an acetyl group under alkaline conditions.

* * * * *